US010345473B2

(12) United States Patent
Hine (10) Patent No.: US 10,345,473 B2
(45) Date of Patent: Jul. 9, 2019

(54) MULTI-DIMENSIONAL FOLDING SEISMIC SENSOR ARRAY (71) Applicant: WESTERNGECO LLC, Houston, TX (US)

(72) Inventor: Roger G. Hine, Menlo Park, CA (US)

(73) Assignee: WESTERNGECO L.L.C., Houston, TX (US)

( * ) Notice: Subject to any disclaimer, the term of this patent is extended or adjusted under 35 U.S.C. 154(b) by 59 days.

(21) Appl. No.: 15/324,257

(22) PCT Filed: Jul. 7, 2015

(86) PCT No.: PCT/US2015/039369
§ 371 (c)(1),
(2) Date: Jan. 5, 2017

(87) PCT Pub. No.: WO2016/007505
PCT Pub. Date: Jan. 14, 2016

(65) Prior Publication Data
US 2017/0199291 A1 Jul. 13, 2017

Related U.S. Application Data (60) Provisional application No. 62/022,027, filed on Jul. 8, 2014.

(51) Int. Cl.
G01V 1/38 (2006.01)
G01V 1/18 (2006.01)

(52) U.S. Cl.
CPC ............ *G01V 1/3808* (2013.01); *G01V 1/189* (2013.01); *G01V 1/3817* (2013.01);
(Continued)

(58) Field of Classification Search
CPC .... G01V 1/3808; G01V 1/3843; G01V 1/189; G01V 1/3817; G01V 2210/169;
(Continued)

(56) References Cited

U.S. PATENT DOCUMENTS 4,845,686 A 7/1989 Brac
5,408,947 A 4/1995 Curto et al.
(Continued)

FOREIGN PATENT DOCUMENTS

WO WO-9951995 A2 * 10/1999 ............. G01S 7/521

OTHER PUBLICATIONS

International Preliminary Report on Patentability for the equivalent International patent application PCT/US2015/039369 dated Jan. 19, 2017.
(Continued)

*Primary Examiner* — Daniel L Murphy
(74) *Attorney, Agent, or Firm* — Kevin B. McGoff (57) ABSTRACT A system having an unmanned marine vessel and a multi-dimensional seismic sensor array coupled to the unmanned marine vessel. The multi-dimensional seismic sensor array is configured to acquire seismic survey data and calculate pressure gradients in multiple directions. The frame includes members that are configured to rotatably pivot with respect to each other in moveable x-shaped crossing configurations.

6 Claims, 6 Drawing Sheets (52) U.S. Cl.
CPC ............ *G01V 1/3843* (2013.01); *G01V 1/181* (2013.01); *G01V 1/186* (2013.01); *G01V 2210/121* (2013.01); *G01V 2210/1293* (2013.01); *G01V 2210/1423* (2013.01); *G01V 2210/169* (2013.01)

(58) Field of Classification Search
CPC ........... G01V 1/186; G01V 2210/1423; G01V 2210/1293; G01V 1/181; G01V 2210/121
USPC .......................................................... 367/18
See application file for complete search history.

(56) References Cited

U.S. PATENT DOCUMENTS

| | | | |
|---|---|---|---|
| 6,493,636 B1* | 12/2002 | DeKok | ................ G01V 1/3861 367/20 |
| 6,590,831 B1 | 7/2003 | Bennett et al. | |
| 8,104,346 B2 | 1/2012 | Paulson | |
| 2008/0148876 A1 | 6/2008 | Hock et al. | |
| 2009/0010101 A1 | 1/2009 | Lunde et al. | |
| 2009/0147626 A1* | 6/2009 | Vahida | ................... G01V 1/006 367/173 |
| 2009/0207697 A1 | 8/2009 | Kitchin et al. | |
| 2010/0226204 A1 | 9/2010 | Gagliardi et al. | |

OTHER PUBLICATIONS

The Extended European Search Report issued in the related EP Application 15818261.8, dated Jun. 4, 2018 (9 pages).
International Search Report and Written Opinion issued in the related PCT application PCT/US2015/039369, dated Oct. 12, 2015 (11 pages).

* cited by examiner

MULTI-DIMENSIONAL FOLDING SEISMIC SENSOR ARRAY

BACKGROUND

The following descriptions and examples do not constitute an admission as prior art {XE "Unintended admission: prior art"} by virtue of their inclusion within this section.

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), while others to particle motion (e.g., geophones). Industrial surveys may deploy one type of sensors or both. In response to the detected seismic events, the sensors generate electrical signals to produce seismic data. Analysis of the seismic data can then indicate the presence or absence of probable locations of hydrocarbon deposits.

Some surveys include long streamers (e.g., as long as 8 kilometers or more), and may have eight or more streamers towed adjacent to one another. The vessels that tow these streamers are generally large and 100 foot long or more. Given the dimensional draft of these vessels, spread may be an issue. Also, the proposition of entanglement or other negative interaction with obstacles may be problematic.

SUMMARY

The following is a brief descriptive summary of some combinations of embodied features to help the understanding of one skilled in the art. It is not meant in any way to unduly limit and present or future claims.

According to various combinations of embodied features, a system includes an unmanned marine vessel having a hull. A multi-dimensional seismic sensor array may be coupled to the hull, wherein the multi-dimensional seismic sensor array is configured to acquire seismic survey data and calculate pressure gradients in multiple directions. The multi-dimensional seismic sensor array may include a frame assembly having members that are configured to rotatably pivot with respect to each other in moveable x-shaped crossing configurations.

According to various combinations of embodied features, a device includes an unmanned marine vessel and a multi-dimensional seismic sensor array configured for coupling to an unmanned marine vessel and configured for floating beneath the unmanned marine vessel at a pre-determined depth. The multi-dimensional seismic sensor array is configured to acquire seismic survey data and calculate pressure gradients in multiple directions. The multi-dimensional seismic sensor array has four seismic streamers and a frame for coupling the four seismic streamers together. The frame is configured to hold the four seismic streamers in a multi-dimensional cuboid type lattice structure in an expanded position. The frame has members that are configured to rotatably pivot with respect to each other in moveable x-shaped crossing configurations.

The above referenced summary section is provided to introduce a selection of concepts in a simplified form that is further described in the detailed description section herein below. The summary is not intended to identify key {XE "Narrowing designation: key"} features or essential {XE "Narrowing designation: essential"} features of claimed subject matter, nor is it intended to be used to limit the scope of the claimed subject matter. The claimed subject matter is not limited to implementations that solve any or all {XE "Narrowing designation: all"} disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only {XE "Narrowing designation: only"} the various implementations described herein and are not meant to limit the scope of various techniques described herein.

DETAILED DESCRIPTION

The discussion below is directed to certain specific implementations. It is to be understood that the discussion below is only {XE "Narrowing designation: only"} for the purpose of enabling a person with ordinary skill in the art to make and use any subject matter defined now or later by the patent "claims" found in any issued patent herein.

It is specifically intended that the claimed invention {XE "Narrowing designation: invention"} not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must {XE "Narrowing designation: must"} be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical {XE "Narrowing designation: critical"} or essential {XE "Narrowing designation: essential"} to the claimed invention unless explicitly indicated as being "critical" or "essential."

It will also be understood that, although the terms first, second, etc. may be used herein to describe various elements, these elements should not be limited by these terms. These terms are only {XE "Narrowing designation: only"} used to distinguish one element from another. For example, a first object or step could be termed a second object or step, and, similarly, a second object or step could be termed a first object or step, without departing from the scope of the invention {XE "Narrowing designation: invention"}. The first object or step, and the second object or step, are both objects or steps, respectively, but they are not to be considered a same object or step.

The following paragraphs provide various techniques for acquiring seismic survey data using a multi-dimensional seismic sensor array coupled to an unmanned marine vessel, vehicle, device, etc., which will now be described in more detail with reference to FIGS. 1-5.

For purposes of introduction, marine surveys may be performed in various marine environments. In one marine survey, unmanned marine vessels, such as autonomously operated vehicles (AOVs) or remotely operated vehicles (ROVs), may be used to gather seismic data from one or more seismic sensors. These seismic sensors may be attached to vertical seismic streamers deployed from the unmanned marine vessels, which may allow for more effective removal of ghost signals and measurement of propagation speed when compared with conventional horizontal streamers.

Figure 1A:
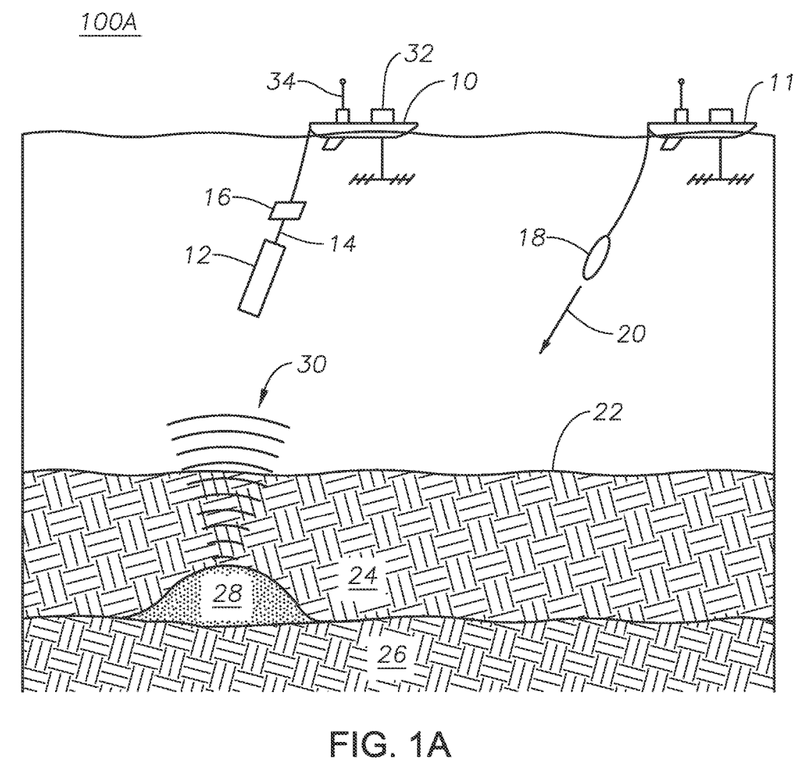
FIGS. 1A-1B illustrate diagrams of systems for acquiring seismic survey data using a multi-dimensional seismic sensor array coupled to an unmanned marine vessel in accordance with implementations of various techniques described herein.
Figure 1B:
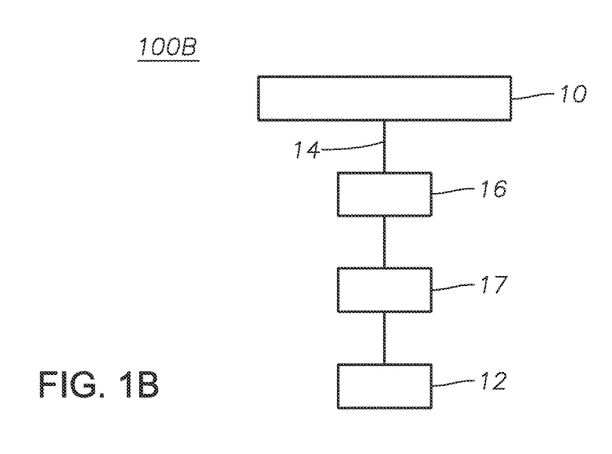

FIGS. 1A-1B illustrate various schematic diagrams of systems 100A, 100B for acquiring seismic survey data in accordance with implementations of techniques described herein. In particular, FIG. 1A illustrates a diagram of a system 100A for acquiring seismic survey data using a multi-dimensional seismic sensor array 12 coupled to an unmanned marine vessel 10, and FIG. 1B illustrates another diagram of a system 100B for coupling the multi-dimensional seismic sensor array 12 to the unmanned marine vessel 10 with a decoupling mechanism 17, in accordance with implementations of various techniques described herein.

The system 100A, 100B may include at least one unmanned marine vessel 10 that may be adapted to descend through a water column or may be adapted for movement on a sea surface via a thrust or propulsion mechanism. The unmanned marine vessel 10 may include an autonomously operating vehicle (AOV) or a remotely operating vehicle (ROV) maneuvering on the sea surface, such as a wave glider or a hybrid water vehicle. In some examples, the wave glider may be configured to harness wave energy to impart motion to the wave glider. In some examples, the hybrid water vehicle may be configured to combine mechanical propulsion methods with energy harvesting principles, such as the energy harvesting principles used by wave gliders. In some examples, the unmanned marine vessel 10 may take the form of one or more other types of marine vessels, such as a diving wave glider, a submarine unmanned marine vessel, a sail buoy, or any other implementation known to those skilled in the art.

The unmanned marine vessel 10 may be used for seismic surveying and may include a multi-dimensional seismic sensor array 12. In various implementations, the term multi-dimensional may refer to two-dimensional (2D), three-dimensional (3D), or more than three dimensional, depending on specific implementations. Further, in some implementations, the multi-dimensional seismic sensor array 12 may be referred to as a seismic sensor package having multiple seismic sensors as described herein.

In reference to FIG. 1A, the multi-dimensional seismic sensor array 12 may be disposed on a streamer 14 coupled to the unmanned marine vessel 10. The streamer 14 may descend in a generally vertical direction from the unmanned marine vessel 10 into a water column. In one implementation, the streamer 14 may descend to a depth below the sea surface. For example, the streamer 14 may descend 10 meters or greater below the sea surface.

In various implementations, the multi-dimensional seismic sensor array 12 may be coupled to the unmanned marine vessel 10 via an umbilical cord or a streamer 14. In one implementation, the multi-dimensional seismic sensor array 12 may be coupled to the hull of the unmanned marine vessel 10. The multi-dimensional seismic sensor array 12 may be configured to acquire seismic survey data, calculate pressure gradients in multiple directions or both. In some examples, the multiple directions may include horizontal and vertical directions. In some other examples, the multiple directions may include x-coordinate, y-coordinate, and z-coordinate directions.

The multi-dimensional seismic sensor array 12 may include various sensors, including pressure sensors, particle motion sensors, and/or multi-component seismic sensors. For example, in reference to multi-component seismic sensors, the multi-dimensional seismic sensor array 12 may be configured to detect a pressure wavefield and at least one component of a particle motion that is associated with acoustic signals that may be proximate to the multi-component seismic sensor. Further, examples of particle motion sensors include one or more components of a particle displacement, one or more components (inline (x), crossline (y) and vertical (z) components) of a particle velocity and one or more components of a particle acceleration.

In various implementations, the multi-component seismic sensors may include one or more geophones, hydrophones, inclinometers, particle displacement sensors, optical sensors, particle velocity sensors, accelerometers, pressure gradient sensors, or combinations thereof. For example, a particular multi-component seismic sensor may include three orthogonally-aligned accelerometers (e.g., three-component micro-electro-mechanical system (MEMS) accelerometer) to measure three corresponding orthogonal components of particle velocity and/or acceleration near the seismic sensor. In some examples, the MEMS-based accelerometer may be a capacitive MEMS-based sensor of the type described in commonly assigned co-pending U.S. patent application Ser. No. 12/268,064, which is incorporated herein by reference. In some implementations, one or more hydrophones configured for measuring pressure may be used in combination with the three-component MEMS described herein.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

In operation, the unmanned marine vessel 10 may be deployed to a survey area for seismic surveying. Where the unmanned marine vessel 10 takes the form of an AOV, the unmanned marine vessel 10 may be deployed to a survey area specified on a navigation map. The unmanned marine vessel 10 may automatically make corrections, if the unmanned marine vessel 10 veers off-course. Where the unmanned marine vessel 10 takes the form of a ROV, the unmanned marine vessel 10 may be deployed to a survey area using remote operation of the unmanned marine vessel's rudder.

After deploying the unmanned marine vessel 10 to the survey area, a seismic source 18 may be detonated to generate acoustic waves 20 that propagate through an ocean bottom surface 22 and into strata 24, 26 beneath the ocean bottom surface. The seismic source 18 may be located on another unmanned marine vessel 11, as shown in FIG. 1A, or a dedicated source vessel. The seismic source 18 may be a conventional air gun, marine vibrator, or non-traditional environmentally friendly source. The seismic source 18 may also include drilling induced acoustic pressure waves, passive seismic noise, or production induced acoustic pressure waves, such as those which may result from water or gas injections, or combinations thereof.

Acoustic signals 20 may be reflected from various subterranean geological formations, such as formation 28 depicted in FIG. 1A. The incident acoustic signals 20 produce corresponding reflected acoustic signals, or pressure waves 30, which are sensed by the multi-dimensional seismic sensor array 12. Although only one seismic sensor is shown in the figure, it should be understood that the unmanned marine vessel 10 may record seismic data from a plurality of seismic sensors.

The multi-dimensional seismic sensor array 12 may generate signals called "traces," which indicate the acquired measurements of the pressure wavefield and particle motion if the sensors include particle motion sensors. The traces are recorded and may be passed to a data acquisition system 32 disposed on the unmanned marine vessel 10. The data acquisition system 32 may include a digitizer, a computer system, and a storage system for storing seismic data acquired during the survey. The computer system and the storage system are described in more detail with reference to FIG. 5. The storage system may include memory, such as a hard disk drive. In one implementation, the seismic data may be recorded continuously over days or months at a time. In another implementation, the seismic data may be recorded intermittently, such as after each detonation of the seismic source 18.

The unmanned marine vessel 10 may include an onboard communication unit 34, which may communicate with a base station located onshore or at sea, such as on a rig or vessel. The communication unit 34 may be used to transmit data and information associated with the unmanned marine vessel 10, including position, quality control parameters, time information, and seismic data. The communication unit 34 may send or receive commands particular to the seismic survey. The unmanned marine vessel 10 may include a power source (e.g., batteries, motor, propeller, etc.) configured to drive and provide propulsion to the unmanned marine vessel 10. In some examples, the unmanned marine vessel 10 may be powered by batteries, which may be recharged by solar panels disposed on the top of the unmanned marine vessel 10.

As mentioned previously and as illustrated in FIG. 1A, the streamer 14 may descend in a generally vertical direction from the unmanned marine vessel 10 into the water column. The length of the streamer 14 may vary from less than one meter to over one kilometer. In some examples, a sub component 16 may be disposed between the umbilical cord or streamer 14 and the multi-dimensional seismic sensor array 12. The sub component 16 may be configured to provide electrical communication between the unmanned marine vessel 10 and the multi-dimensional seismic sensor array 12. In some examples, the sub component 16 may be employed as a fairing to reduce cross-flow noise due to currents and drag forces. Further, in some examples, accelerometers (not shown) capable of measuring a gravity vector may be used to measure a tilt of the streamer 14 relative to the vertical.

In reference to FIG. 1B, the system 100B may be referred to as an assembly or an ensemble of the unmanned marine vessel 10 including a wave glider float, the umbilical cord 14, the sub component 16, the decoupling mechanism 17, and the multi-dimensional seismic sensor array 12. In some implementations, the decoupling mechanism 17 may be used to couple the multi-dimensional seismic sensor array 12 to the unmanned marine vessel 10. As shown in FIG. 1B, the decoupling mechanism 17 may be disposed between the sub component 16 and the multi-dimensional seismic sensor array 12.

In some implementations, the umbilical cord 14 may be thinner than conventional towed streamers and may be configured for facilitating ease of handling by the unmanned marine vessel 10. For example, the umbilical cord 14 may have a diameter of one half of one inch. Further, the umbilical cord 14 may be formed of fiber optic cables and/or cables with fiber optic sensors may be used, thus resulting in a lighter and thinner streamer relative to conventional towed streamers.

Figure 2A:
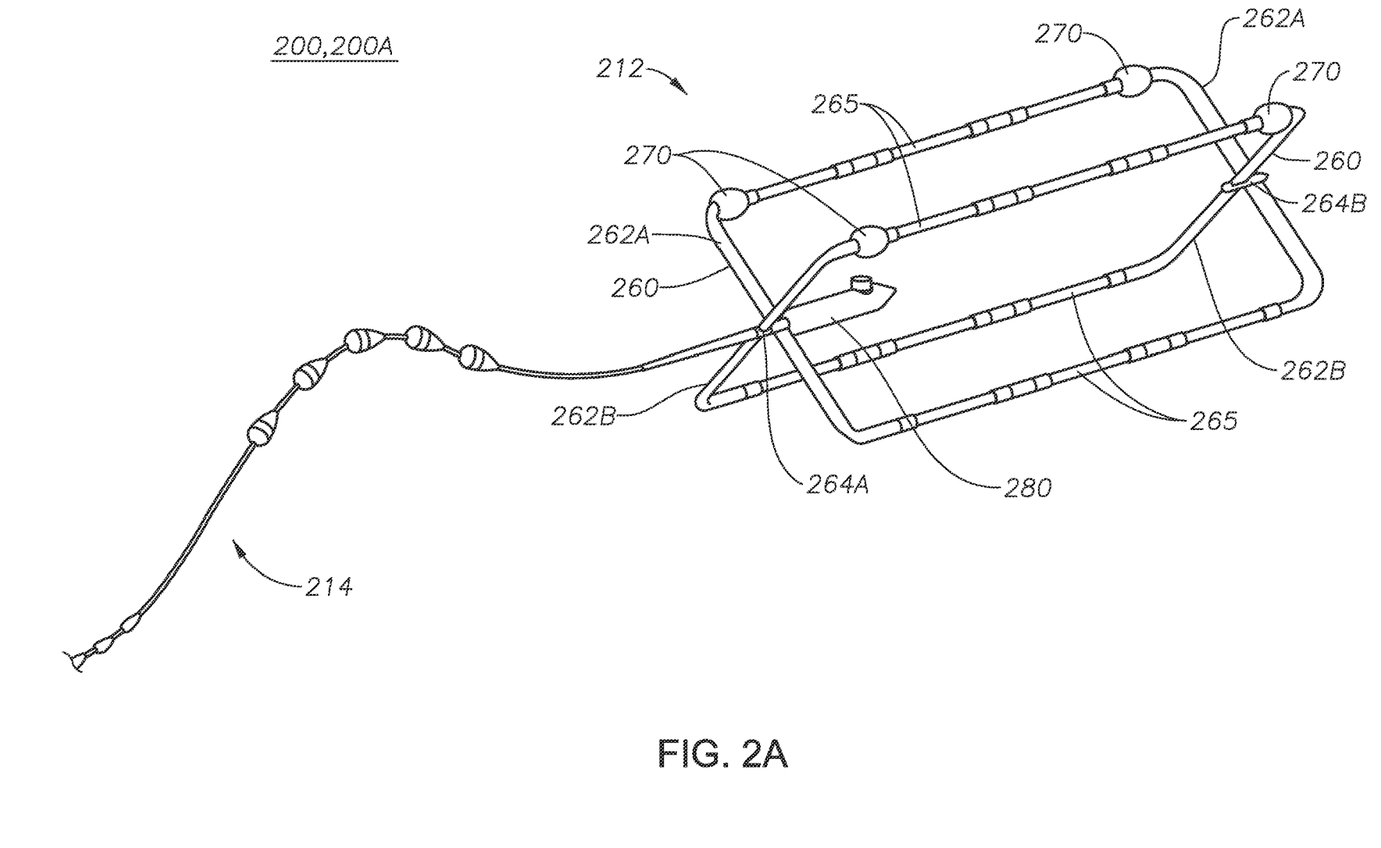
FIGS. 2A-2B illustrate various diagrams of another device for acquiring seismic survey data using a multi-dimensional seismic sensor array coupled to an unmanned marine vessel in accordance with implementations of various techniques described herein.
Figure 2B:
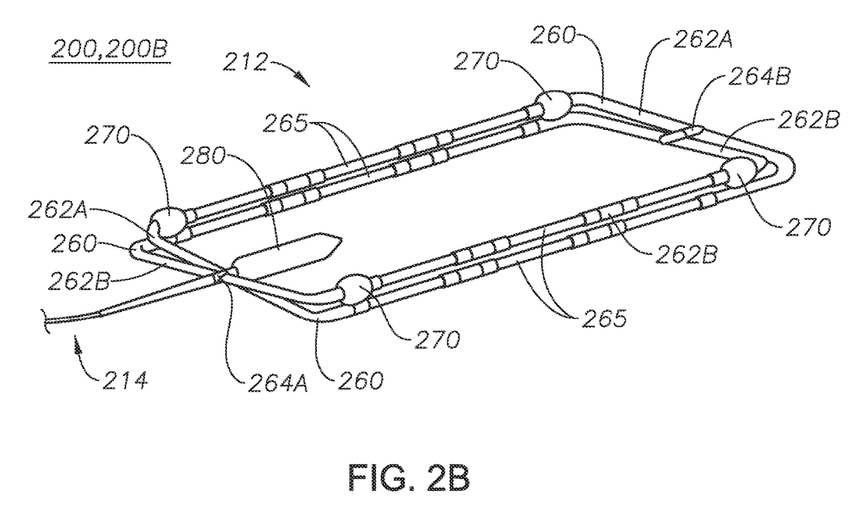

FIGS. 2A-2B illustrate various diagrams of a device 200 for acquiring seismic survey data using a multi-dimensional seismic sensor array 212 coupled to an unmanned marine vessel (e.g., the unmanned marine vessel 10 of FIG. 1A) in accordance with implementations of various techniques described herein. In particular, FIG. 2A illustrates a diagram of the device 200 in an expanded (or substantially expanded) x-shaped crossing configuration 200A. FIG. 2B illustrates another diagram of the device 200 in a contracted (or substantially contracted) x-shaped crossing configuration 200B. As described herein, the multi-dimensional seismic sensor array 212 may be coupled to the unmanned marine vessel 10 (e.g., a wave glider float) via an umbilical cord or streamer 214, and the seismic sensor array 212 may be configured to acquire seismic survey data and calculate pressure gradients in multiple directions. For instance, the multi-dimensional seismic sensor array 212 may be coupled to a hull of the unmanned marine vessel 10. In some examples, the umbilical cord or streamer 214 may include a motion isolating s-curve tow cable. Further, the multi-dimensional seismic sensor array 212 may be configured for floating beneath an unmanned marine vessel at a predetermined deployment depth in a water column.

Figure 3:
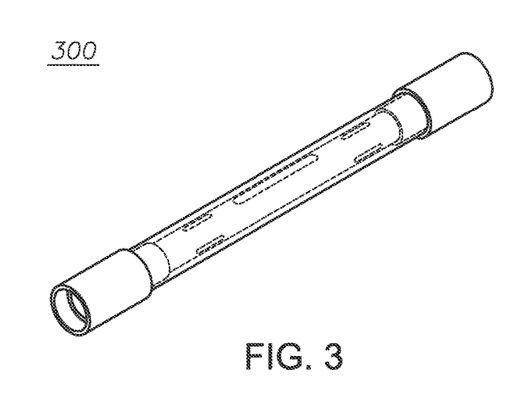
FIG. 3 illustrates a diagram of a seismic sensor module in accordance with implementations of various techniques described herein.

The multi-dimensional seismic sensor array 212 may include a pair of members 262A, 262B that may be used to couple multiple seismic streamers 265 together (e.g., four seismic streamers coupled together) to form the multi-dimensional seismic sensor array 212. In some examples, each seismic streamer 265 may include one or more seismic sensor modules (e.g., three seismic sensor modules). The three or more seismic sensor modules may be coupled, held, joined, or linked together, e.g., in series. An example of a seismic sensor module 300 is shown in FIG. 3. In one implementation, the seismic streamers 265 may be shorter than streamer 214.

Further, the pair of members 262A, 262B may form a frame or frame assembly 260 for coupling the multiple seismic streamers 265 together. The frame 260 may be configured to couple or hold the multiple seismic streamers 265 in a multi-dimensional cuboid type lattice structure in a substantially expanded position. The pair of members 262A, 262B may be referred to as structural members or arms. The multiple members or arms or pairs of arms 262A, 262B may be coupled together to rotatably pivot with respect to each other in moveable x-shaped crossing configurations. As shown, the frame or frame assembly 260 may include pins or other hinge devices that are configured to provide a first pivot point 264A and a second pivot point 264B. In some examples, the members 262A, 262B may be configured to move between the substantially expanded x-shaped crossing configuration 200A (e.g., as shown in FIG. 2A) and the substantially contracted x-shaped crossing configuration 200B (e.g., as shown in FIG. 2B). As such, the frame or frame assembly 260 along with the multiple seismic streamers 265 may be configured to move between the substantially expanded x-shaped crossing configuration 200A and the substantially contracted x-shaped crossing configuration 200B.

Using the seismic sensor array 212, the pressure gradient and/or second derivative of pressure in x, y, and z directions may be calculated. In some examples, this may be achieved when the seismic sensor array 212 is positioned in the substantially expanded x-shaped crossing configuration 200A as shown in FIG. 2A. Further, the seismic sensor array 212 may allow for performing 3D deghosting and also interpolation of the pressure in x and y directions. Still further, the multi-dimensional seismic sensor array 212 may allow for detecting direction of the seismic arrival.

The multi-dimensional seismic sensor array 212 may include one or more buoyancy elements or floats 270 configured to maintain the multi-dimensional seismic sensor array 212 at a particular depth in a water column. In some implementations, a number of buoyancy elements floats 270 may be positioned at multiple locations (e.g., two locations). The buoyant floats 270 may be configured to vertically stabilize the seismic sensor array 212.

In some implementations, the multi-dimensional seismic sensor array 212 may include a transponder 280 (e.g., a center pod) having one or more of a USBL beacon, a buoyancy auto-trim, a compass, and a depth sensor. In some implementations, the transponder 280 may be positioned in a middle or central portion of the frame or frame assembly 260.

As shown in FIG. 2A, when the multi-dimensional seismic sensor array 212 is in the expanded x-shaped configuration 200A, the seismic sensor modules are positioned separate from each another. As shown in FIG. 2B, when the multi-dimensional senor array 212 is in the contracted x-shaped configuration 200B, the seismic sensor modules are positioned substantially close together in adjacent pairs.

The multiple members 262A, 262B may be referred to as crossbars having a streamlined contour for horizontally stabilizing the seismic sensor array 212 in a water column. In some implementations, the multiple members 262A, 262B may rotatably pivot with respect to each other in moveable crossing x-shaped configurations when moving between the substantially expanded x-shaped configuration 200A and the substantially contracted x-shaped configuration 200B.

In FIGS. 2A-2B, the four seismic streamers 265 (or seismic sensor modules 300 as shown in FIG. 3) may be connected at each end to the members 262A, 262B to assemble or form the frame or frame assembly 260. In this implementation, once assembled, the frame or frame assembly 260 may be connected with the seismic streamers 265 and moved in the substantially expanded and/or substantially contracted configurations 200A, 200B. In the expanded configuration 200A, as show in FIG. 2A, the seismic streamers 265 may be separated from one another. In the contracted configuration 200B, as shown in FIG. 2B, the seismic streamers 265 may be adjacent to one another in pairs (e.g., touching or not touching). When extended, the frame or frame assembly 260 may provide the seismic streamers 265 in a substantially parallel configuration to one another, and in a rectangular or square configuration when viewed along an axial direction of the seismic streamers 265 in cross section. When folded/contracted (e.g., in position for storage or transportation), two of the seismic streamers 265 may be positioned or located closely adjacent to one another to reduce space that the frame or frame assembly 260 takes up. Further, the frame or frame assembly 260 may include or be composed of two members 262A, 262B that form a moveable/foldable "X" or cross configuration, with pins or other hinge devices (e.g., pivot points 264A, 264B) connecting or coupling central parts of each pair of members 262A, 262B together. As shown, the frame or frame assembly 260 folds substantially flat for storage on a marine vessel (e.g., a wave glider) during transport.

In some implementations, the seismic sensor array 212 may be configured to have a total displacement of (or substantially) ~11 kg (recoverable by hand) and a total length of (or substantially) 1.8 m. Further, the seismic sensor array 212 may be configured to have with an array spacing of (or substantially) 520 mm×520 mm (wide×tall) and 3× 200 mm spacing along axis (may be 2×, 4× . . . ).

FIG. 3 illustrates a schematic diagram of a seismic streamer or seismic sensor module 300 for acquiring seismic data in accordance with implementations of various techniques described herein. In some implementations, the seismic sensor module 300 includes an elongated cylindrical (or tubular) housing having an interior region for encapsulating one or more seismic sensors. For instance, the seismic sensor module 300 may include one or more hydrophones, one or more MEMS accelerometers, one or more geophones, one or more inclinometers, or other types of seismic sensors typically used for marine seismic acquisition.

Figure 4A:
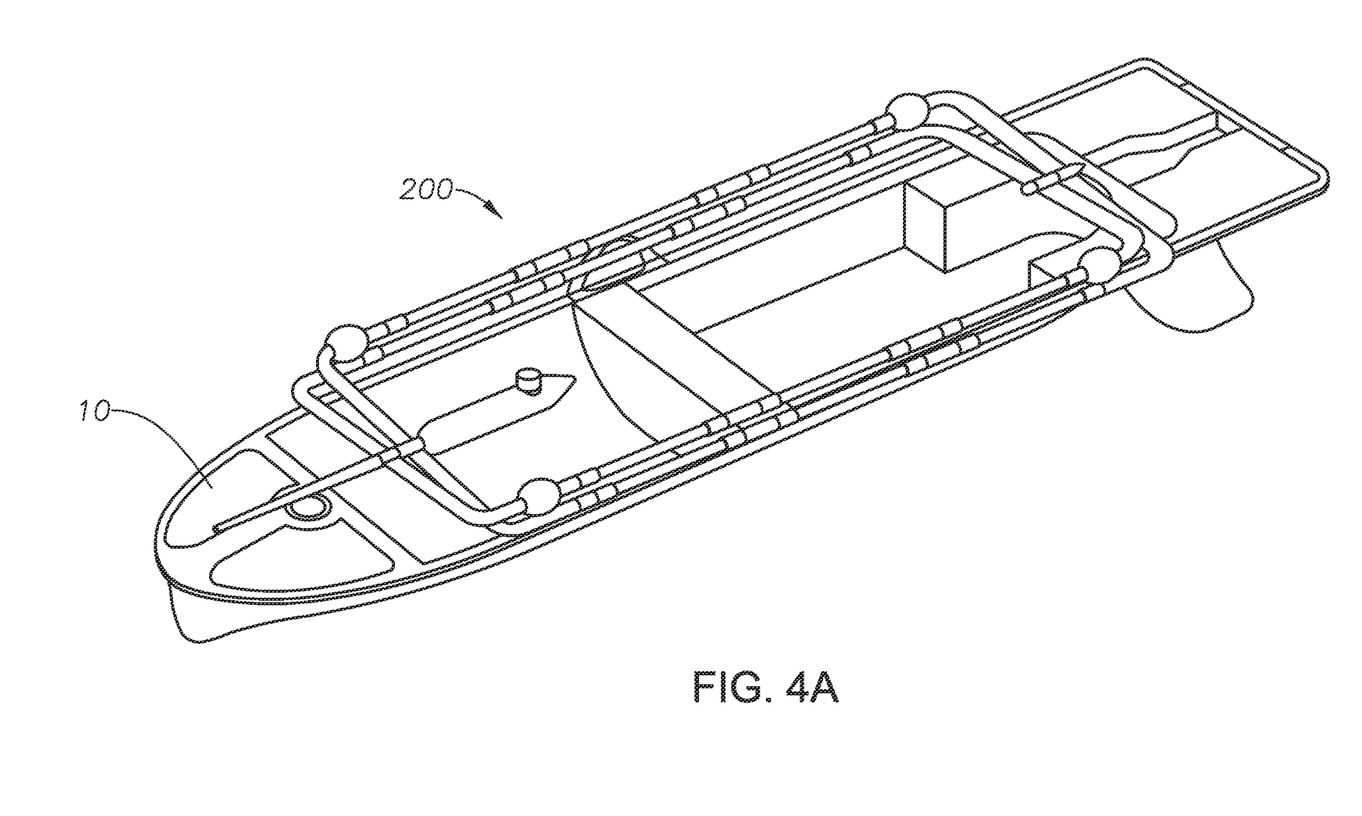
FIGS. 4A-4C illustrate various diagrams of the contracted seismic sensor array device positioned on a marine vessel for storage and/or transport in accordance with implementations of various techniques described herein.
Figure 4B:
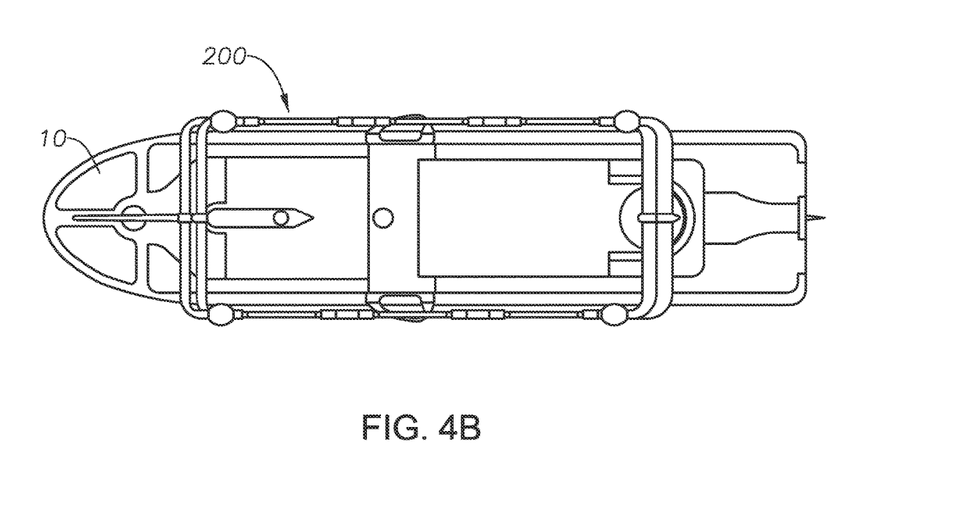
Figure 4C:
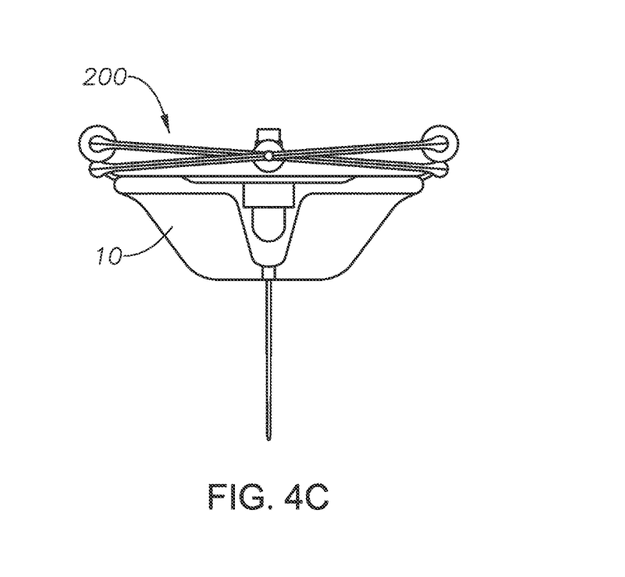

FIGS. 4A-4C illustrate various diagrams of the contracted seismic sensor array device 200 of FIG. 2B positioned on an unmanned marine vessel 10 (e.g., wave glider) for storage and/or transport in accordance with implementations of various techniques described herein. In particular, FIG. 4A illustrates a perspective view of the unmanned marine vessel 10 and the substantially contracted seismic sensor array device 200 positioned for storage and/or transport, FIG. 4B illustrates a top view of the unmanned marine vessel 10 and the substantially contracted seismic sensor array device 200 positioned for storage and/or transport, and FIG. 4C illustrates a rear view of the marine vessel 10 and the substantially contracted seismic sensor array device 200 positioned for storage and/or transport.

In some implementations, the seismic sensor array device 200 may be configured to fold substantially flat for storage on the unmanned marine vessel 10 during transport. For example, the seismic sensor array device 200 may be configured to fold flat and store on top of a wave glider float. The seismic sensor array device 200 may include side recovery bales configured to clear away, and the center pod 280 may also be configured to clear away when the seismic sensor array device 200 is folded in the substantially contracted configuration 200B.

Figure 5:
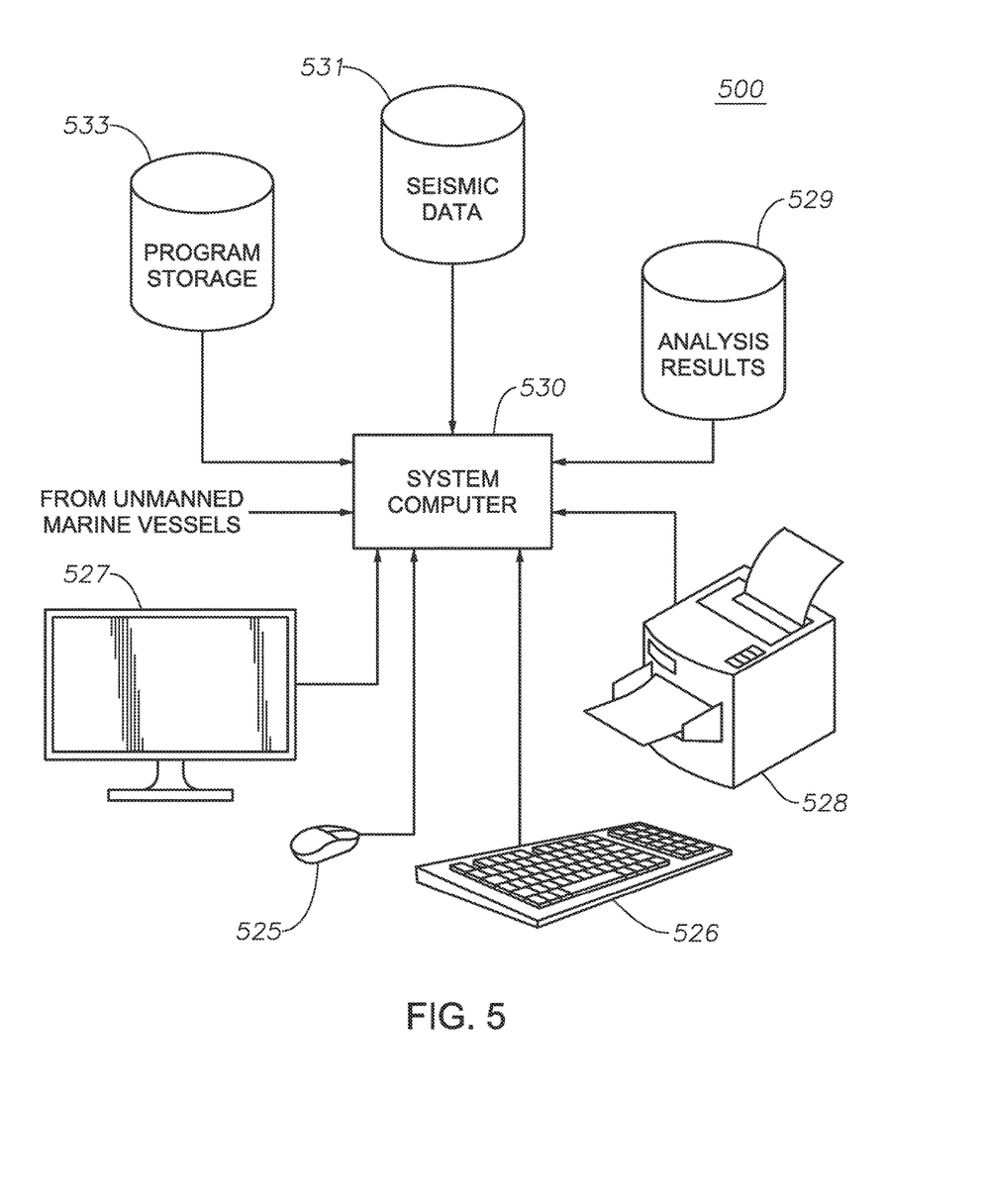
FIG. 5 illustrates a computing system in accordance with implementations of various techniques described herein.

FIG. 5 illustrates a computing system 500 that may be used in connection with various implementations described herein may be implemented. The computing system 500 (system computer) may include one or more system computers 530, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all {XE "Narrowing designation: all"} of the program instructions, measurement data, and results as desired.

In one implementation, seismic data from the sensors may be stored in disk storage device 531. The system computer 530 may retrieve the appropriate data from the disk storage device 531 to process seismic data according to program instructions that correspond to implementations of various techniques described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only {XE "Narrowing designation: only"} memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures or other program modules. By way of example, and not limitation, communication media may include wired media such as a wired network or direct-wired connection, and wireless media such as acoustic, radio frequency (RF), infrared (IR), and various other wireless media. Further, combinations of any of the above may also be included within the scope of computer readable media.

In one implementation, the system computer 530 may provide output primarily onto graphics display 527, or alternatively via printer 528. The system computer 530 may store the results of the methods described above on disk storage 529, for later use and further analysis. Further, the keyboard 526 and/or the pointing device 525 (e.g., a mouse, trackball, or the like) may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. In one implementation, these signals and data may be sent to the system computer 530 directly from sensors, such as geophones, hydrophones, and the like. When receiving data directly from the sensors, the system computer 530 may be described as part of an in-field data processing system. In another implementation, the system computer 530 may process seismic data already stored in the disk storage 531. When processing data stored in the disk storage 531, the system computer 530 may be described as part of a remote data processing center, separate from data acquisition. The system computer 530 may be configured to process data as part of the in-field data processing system, the remote data processing system or a combination thereof.

While FIG. 5 illustrates the disk storage 531 as directly connected to the system computer 530, it is also contemplated that the disk storage device 531 may be accessible through a local area network or by remote access. Further, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily {XE "Narrowing designation: necessarily"} limited to the specific features or acts described above. Rather, the specific features and acts described above are disclosed as example forms of implementing the claims.

What is claimed is:

1. A device, comprising:
  an unmanned marine vessel;
  a multi-dimensional seismic sensor array configured to couple to the unmanned marine vessel and configured to float beneath the unmanned marine vessel at a pre-determined depth, wherein the multi-dimensional seismic sensor array is configured to acquire seismic survey data, and wherein the multi-dimensional seismic sensor array comprises:
    four seismic streamers; and
    a frame for coupling the four seismic streamers together, wherein the frame is configured to hold the four seismic streamers in a multi-dimensional cuboid type lattice structure in a substantially expanded position; and
  wherein the frame comprises members that are configured to rotatably pivot with respect to each other in moveable x-shaped crossing configurations.

2. The device of claim 1, wherein the members are configured to move between a substantially expanded x-shaped configuration and a substantially contracted x-shaped configuration.

3. The device of claim 1, wherein the multi-dimensional seismic sensor array is configured to calculate pressure gradients in multiple directions.

4. The device of claim 1, wherein the frame along with the four seismic streamers are configured to move between a substantially expanded x-shaped crossing configuration and a substantially contracted x-shaped crossing configuration.

5. The device of claim 1, wherein the multi-dimensional seismic sensor array comprises one or more buoyant floats configured to vertically stabilize the multi-dimensional seismic sensor array.

6. The device of claim 1, wherein each seismic streamer comprises multiple seismic sensor modules, wherein each of the multiple seismic sensor modules comprises one or more of a hydrophone and a micro-electro-mechanical sensor (MEMS) accelerometer.

\* \* \* \* \*